Oct. 13, 1931.　　　　A. Y. DODGE　　　　1,827,421
BRAKE
Filed June 6, 1928　　　2 Sheets-Sheet 1
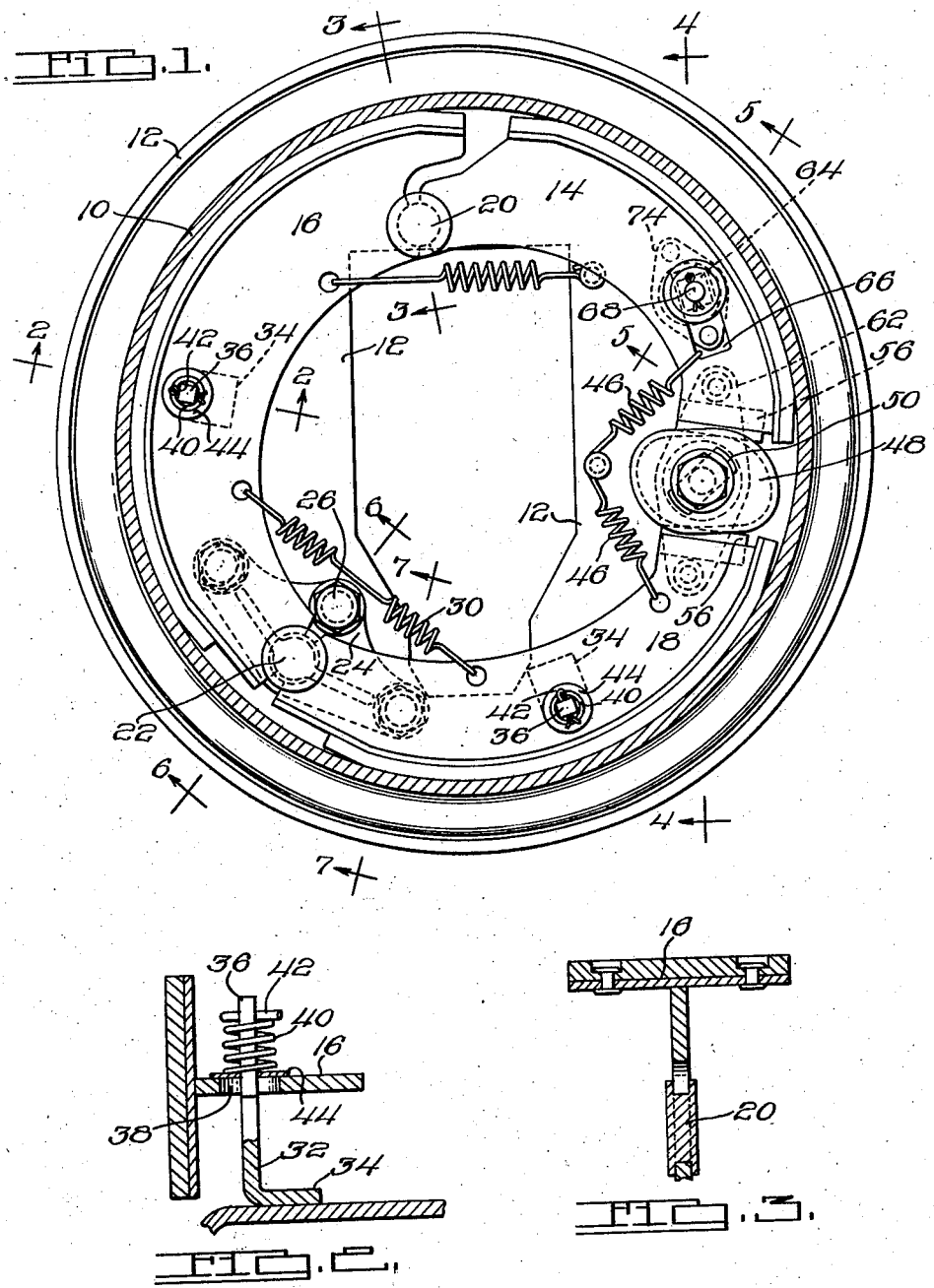
INVENTOR
Adiel Y. Dodge
BY
M. W. McConkey
ATTORNEY

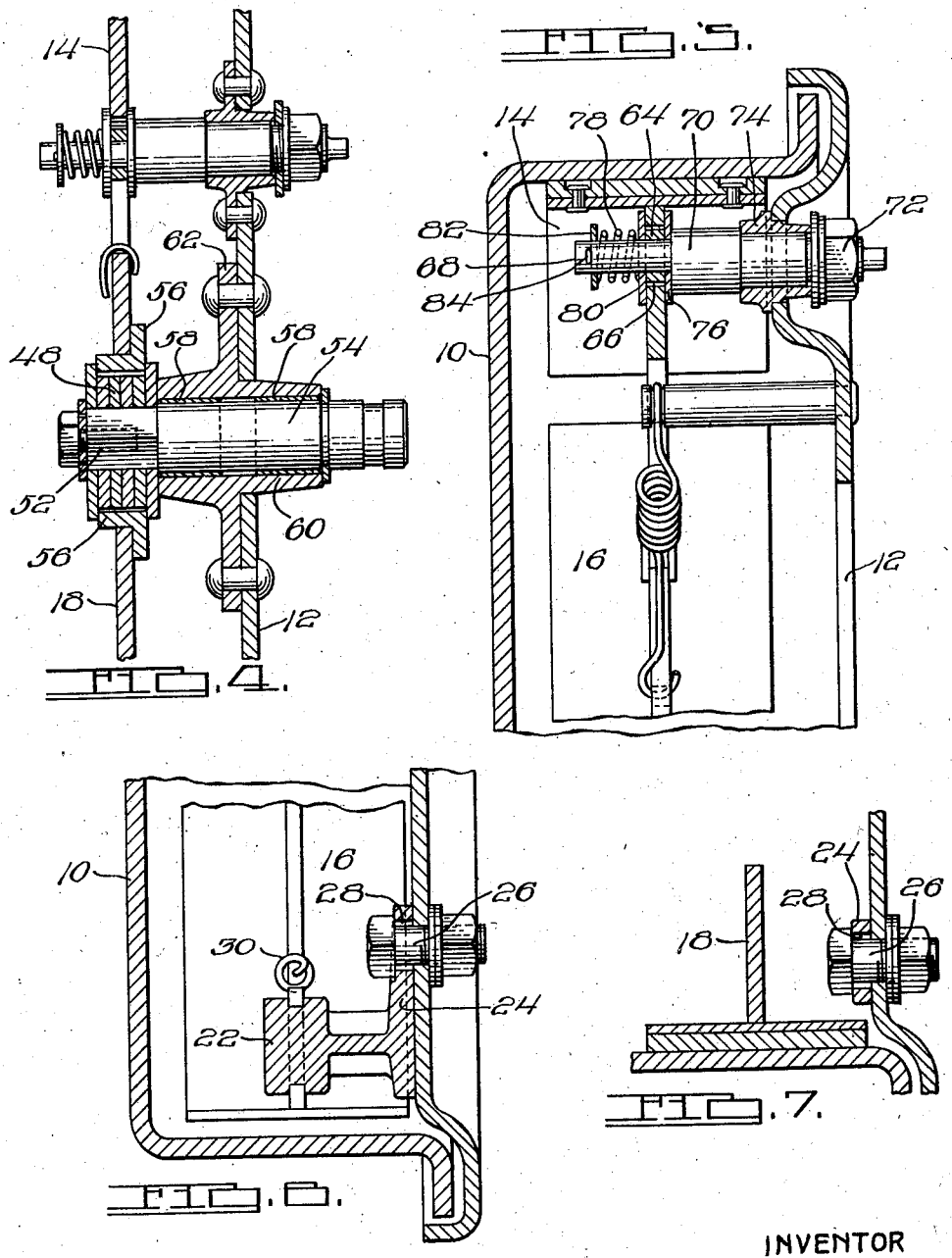

Patented Oct. 13, 1931

1,827,421

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE

Application filed June 6, 1928. Serial No. 283,239.

This invention relates to brakes and is illustrated as embodied in an internal expanding brake for an automobile. An object of the invention is to simplify the construction of the brake to permit it to be manufactured at an extremely low price without undue sacrifice of its efficiency.

Among the various features of novelty are included a novel anchoring arrangement in which two of the shoes that are equivalents are formed with sockets directly seating against a stationary anchor member preferably formed as a projection from a bracket fastened to the backing plate of the brake, novel shoe positioning and guiding means, a novel arrangement of the operating cam with respect to the shoes, and other desirable details of construction which will be apparent from the following description of the illustrative embodiment shown in the accompanying drawings, in which:

Figure 1 is a vertical section through the brake just inside the brake drum and showing the brake shoes in side elevation;

Figure 2 is a partial section through the brake on line 2—2 of Figure 1 and showing a positioning device for one of the shoes;

Figure 3 is a section through one of the shoes on the line 3—3 of Figure 1 showing part of the shoe-guiding means;

Figure 4 is a partial section through the brake on the line 4—4 of Figure 1 and showing the structure of the cam and its arrangement with respect to the shoes;

Figure 5 is a partial section through the brake on the line 5—5 of Figure 1 showing the primary shoe and part of the guiding means for it;

Figure 6 is a partial section on the line 6—6 of Figure 1 showing the anchorage of the brake; and Figure 7 is a partial section on the line 7—7 of Figure 1 illustrating the adjustment of the anchorage.

The illustrated brake includes a rotatable drum 10, at the open side of which is a suitable support such as a backing plate 12, and within which is arranged the friction means of the brake. The illustrated friction means includes three T-section stamped steel brake shoes 14, 16 and 18, the three shoes being arranged with their stiffening webs all substantially in the same plane.

Shoes 14 and 16 have the adjacent ends of their webs formed with semi-circular sockets engaging opposite sides of a spool-shaped thrust member 20 having flanges at opposite sides which embrace the opposite sides of the webs of the shoes. Shoes 16 and 18 have their webs formed with semi-circular sockets engaging opposite sides of a spool-shaped boss 22 formed as an integral projection from a base 24 adjustably mounted on the backing plate 12 by three clamping bolts 26 passing through relatively large openings 28 in the base 24. The boss 22 serves as the brake anchor against which the shoes are held by tension spring 30.

The shoes 16 and 18 are shown positioned laterally by steady rests in the form of stampings 32 having flanges 34 forming bases at right angles to the rests proper and which bases are spot-welded or otherwise secured to the backing plate 12. The rests 32 are formed with oppositely extending shoulders engaging the webs of the shoes 16 and 18 on the side next to the backing plate and with relatively narrow extensions 36 extending through openings 38 in the webs of the shoes. Springs 40 sleeved on the extensions 36 are confined between cotter pins 42 in the ends of the extensions of the steady rests and washers 44 engaging the webs of the shoes on the sides opposite the backing plate. This holds the webs of the shoes yieldably against the shoulders of the steady rests 32.

The brake is applied against the resistance of return springs 46 by means such as a novel cam 48 shown as built up in a laminated structure of flat steel stampings spot-welded or otherwise secured together to form a unit and which have aligned slots 50 formed therein slidably to embrace a flattened portion 52 of a cam shaft 54. The two outer laminations of the cam 48 extend beyond the others to form an annular groove in the cam which embraces hardened L-shaped thrust plates 56 secured to the ends of the webs of the shoes 14 and 18. The shaft 54 is shown journaled in bronze bushings 58 pressed into a bearing 60 formed on a bracket 62 which may be riveted to the backing plate of the brake.

The shoe 14 is guided in the application of the brake by a squared block 64 slidably arranged in a slot 66 in the web of the shoe 14 and which is pivoted on a relatively small extension 68 extending through the shoe from a post 70 secured by a clamping nut 72 in a fitting 74 riveted to the backing plate. The movement of the shoe in applying the brake causes the slot 66 to slide on the squared guide block 64 to predetermine the direction of movement of the shoe so that the shoes 14 and 16 will engage the brake drum substantially at the same time. This construction is not claimed broadly herein as it forms the subject-matter of application No. 233,754, filed November 17, 1927, by myself jointly with Roy S. Sanford. The guide illustrated herein, however, embodies substantial novelty in the details of its construction and it is my intention to claim these novel details in the present application.

In order that the guide described above may also serve as a steady rest for the shoe 14, it is provided with a washer 76 resting on the enlarged portion 70 and engaging one side of the web of the shoe 14 and with a coil spring 78 confined between a washer 80 engaging the opposite side of the web and a washer 82 held on the end of the reduced portion 68 by means such as a cotter pin 84.

While one illustrative embodiment of the invention has been described in detail, it is not my intention to limit its scope to that particular embodiment or otherwise than by the terms of the appended claims.

I claim:

1. A brake comprising, in combination, a stationary support, a bracket adjustably mounted on the support and having a boss formed with a spool-shaped portion, and friction means including shoes having their webs formed with semi-circular sockets embracing the spool-shaped portion of said boss.

2. A brake comprising, in combination, a backing plate, a shoe having a web substantially paralleling the backing plate and formed with an opening, and a stamping having one end turned at right angles and secured to the backing plate and shouldered to engage the side of said web next to the backing plate and formed with a relatively small extension passing through the opening, and a spring sleeved on said extension and compressed against the side of the web opposite the backing plate.

3. A brake comprising, in combination, an operating cam formed with an annular groove and a shoe having an L-shaped thrust member secured to its end and seated in said groove.

4. A brake comprising, in combination, a pair of connected shoes one of which is anchored, a guide for the unanchored shoe, and means carried by said guide serving as a steady rest for the unanchored shoe.

5. A brake comprising a shoe formed with a slot extending generally lengthwise of the shoe, a guide passing through said slot and controlling the movement of the shoe, and means carried by said guide and serving as a steady rest for the shoe.

6. A brake comprising, in combination, a brake shoe formed with an elongated slot, a shouldered member having a part engaging one side of the shoe and having a part extending through said slot, a guide mounted on said part and slidably received in the slot, and a coil spring carried by said part and compressed against the opposite side of the shoe.

7. A brake anchor comprising a generally triangular base having an integral extension formed with a spool-shaped boss.

In testimony whereof, I have hereunto signed my name.

ADIEL Y. DODGE.